(No Model.)

G. N. SPENCER.
PLOW FENDER.

No. 482,595. Patented Sept. 13, 1892.

WITNESSES:
Chas. Nida.
C. Sedgwick

INVENTOR:
G. N. Spencer
BY Munn & Co.
ATTORNEYS

UNITED STATES PATENT OFFICE.

GASTON N. SPENCER, OF OUACHITA CITY, LOUISIANA, ASSIGNOR TO HIMSELF AND WILLIE EDWIN HOPKINS, OF SAME PLACE.

PLOW-FENDER.

SPECIFICATION forming part of Letters Patent No. 482,595, dated September 13, 1892.

Application filed November 9, 1891. Serial No. 411,268. (No model.)

*To all whom it may concern:*

Be it known that I, GASTON N. SPENCER, of Ouachita City, in the parish of Union and State of Louisiana, have invented a new and Improved Plow-Fender, of which the following is a full, clear and exact description.

My invention relates to improvements in fenders for plows or similar devices; and the object of my invention is to produce a simple, durable, and efficient fender which may be easily applied to any ordinary plow or other device which is used to plow or cultivate between rows of growing plants and which will prevent the plow or cultivator from throwing heavy clods or other articles upon the plants, but will cause the dirt to be partially sifted, so that only the fine dirt and the requisite quantity of it shall be thrown around the roots of the plants.

To this end my invention consists in a plow-fender the construction of which will be hereinafter described and claimed.

Reference is to be had to the accompanying drawings, forming a part of this specification, in which similar figures of reference indicate corresponding parts in all the views.

Figure 1:
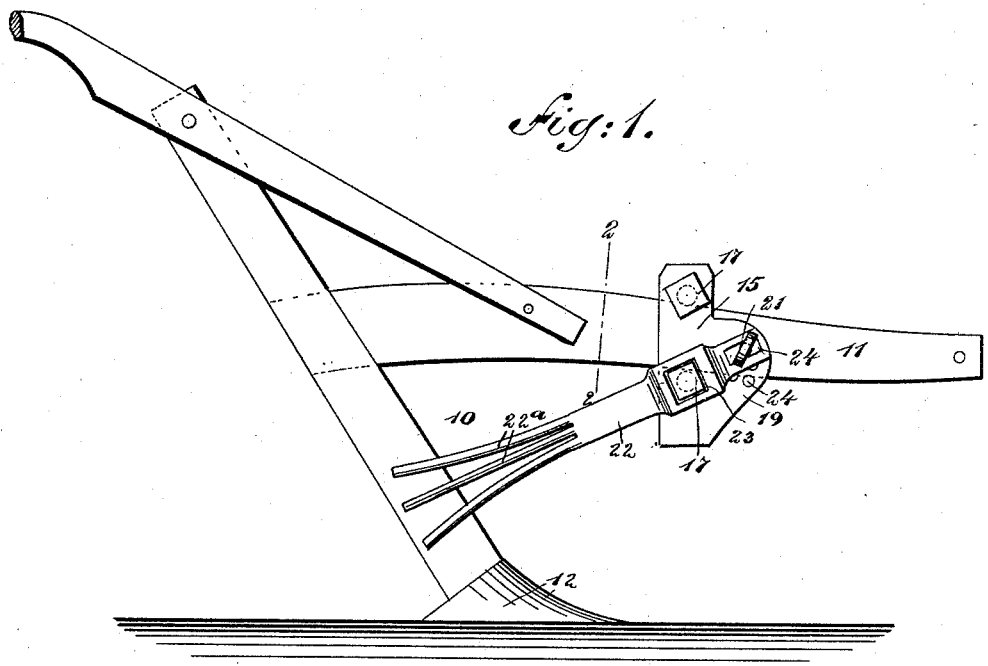
Figure 4:
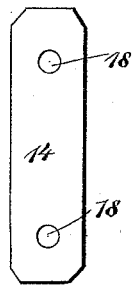
Figure 2:
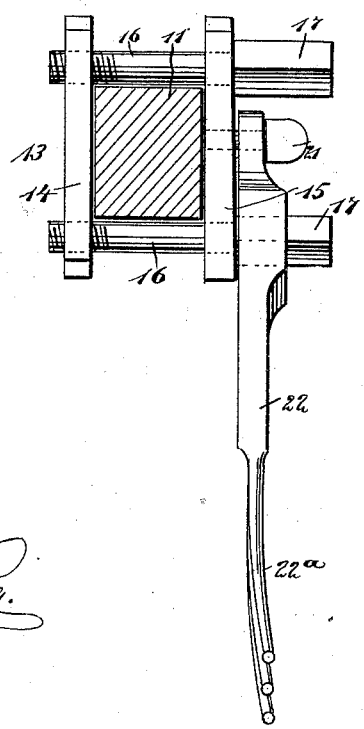
Figure 3:
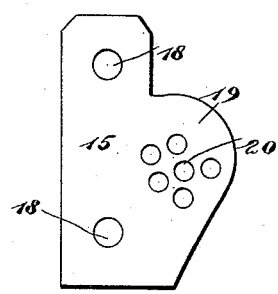

Figure 1 is a side elevation of the fender as applied to a plow. Fig. 2 is a cross-section on the line 2 2 in Fig. 1. Fig. 3 is a detail side elevation of one side piece of the clamp, and Fig. 4 is a detail side elevation of the opposite side piece.

The plow 10 is of a common form and may be of any approved construction, it having the usual plow-beam 11 and the shovel-point 12, although any kind of a point may be used.

The device embodying my invention is provided with a clamp 13, by means of which it is secured to the plow-beam, which clamp consists of the two side pieces 14 and 15, and the bolts 16, which connect the side pieces and pass above and below the plow-beam 11, the said bolts having prolonged squared heads 17. The side pieces have holes 18 at their upper and lower ends to receive the bolts, and the holes are screw-threaded, so that the bolts 16 may be inserted from either side and will clamp the side pieces firmly upon the plow-beam. The side piece 15 has a projection 19 on one edge, in which is a series of holes 20, which are adapted to receive a thumb-screw 21, and which, being at different heights, provide for the adjustment of the fender 22. This fender 22 is adapted to extend rearward to a point above the plow proper or point 12, where it terminates in a series of spring-fingers 22$^a$, three fingers being preferably employed; but it may have any desired number.

The fender is provided near its upper end with a recess or socket 23, which is adapted to fit upon the bolt-heads 17, and consequently the fender serves as a wrench by means of which the bolts may be quickly and easily tightened. In the extreme upper end of the fender is a slot 24, through which the thumb-screw 21 passes, and the thumb-screw has a head wide enough to extend across the slot, so that when adjusted it will prevent the fender from swinging. It will be seen that by removing the thumb-screw and placing the fender in a desired position and then inserting the thumb-screw in the slot 24 and in one of the holes 20 the fender may be held at the exact height desired, so that it will extend between the dirt thrown up by the plow 12 and the plants, and this adjustability of the fender enables it to be applied to a plow having either a high or low beam. If desired, a wedge may be inserted between one of the side pieces of the clamp and the plow-beam, so as to bring the fender the desired distance laterally from the plow, and by passing the bolts through the clamp in the direction opposite to that shown in the drawings and then turning the fender half over and applying it to the other side of the plow-beam the fender may be adapted to said other side of the plow.

When the device is to be used, the fender is adjusted on the lower bolt-head, and the operation of the fender is as follows: The plow is run along between the rows of plants, so as to throw up the dirt around them, and the spring-fingers of the fender will catch the heavy clods and other large articles which are liable to injure the plants, but will permit the fine dirt to pass between them and around the roots of the plants.

Having thus fully described my invention, I claim as new and desire to secure by Letters Patent—

1. The combination, with a clamp having a series of holes and provided with bolts having projecting heads, of a fender having spring-fingers at one end, a socket at the other end to receive one of the bolt-heads, and an opening at one side of the socket, through which and into one of the holes of the clamp a thumb-screw is adapted to be passed, substantially as described.

2. A device of the character described, comprising a clamp consisting of two side pieces, one of which is widened and provided with a series of holes, and bolts having squared heads connecting the side pieces, and a fender having spring-fingers at one end, a socket to fit the bolt-heads, and a slotted end and thumb-screw to facilitate its attachment to the widened side piece of the clamp, substantially as described.

GASTON N. SPENCER.

Witnesses:
JAMES T. SPENCER,
FRANCIS W. PULLEN.